L. F. CHANEY.
DIMMING DEVICE FOR AUTOMOBILE LAMPS.
APPLICATION FILED APR. 6, 1914.
1,184,924. Patented May 30, 1916.
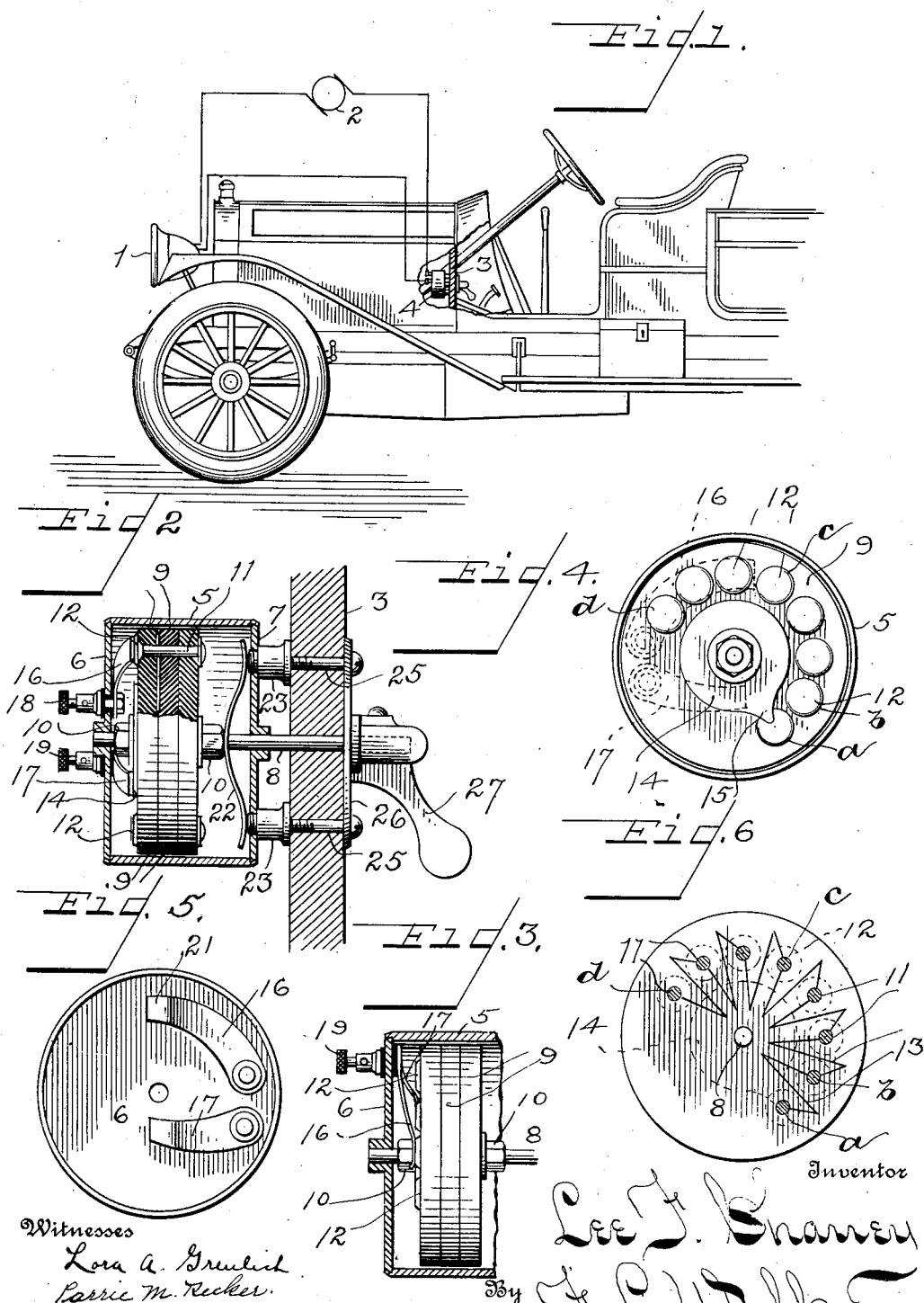

UNITED STATES PATENT OFFICE.

LEE F. CHANEY, OF SPRINGFIELD, OHIO.

DIMMING DEVICE FOR AUTOMOBILE-LAMPS.

1,184,924. Specification of Letters Patent. Patented May 30, 1916.

Application filed April 6, 1914. Serial No. 829,733.

*To all whom it may concern:*

Be it known that I, LEE F. CHANEY, a citizen of the United States, residing at Springfield, in the county of Clark and State of Ohio, have invented certain new and useful Improvements in Dimming Devices for Automobile-Lamps, of which the following is a specification.

My invention relates to lighting systems for vehicles and particularly to means for dimming automobile head lights.

The object of the invention is to simplify the structure as well as the means and mode for operation of such devices whereby they will not only be cheapened in construction but will be more efficient in use, easily and quickly adjusted and unlikely to get out of repair.

A further object of the invention is to provide means within the reach of the driver for varying the degree of brilliancy of the light throughout an extended range of adjustment without placing the driver in danger of being shocked by any possible short circuiting of the electric current.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Figure 1 is a side elevation of a portion of an automobile to which the lamp dimming device forming the subject matter hereof has been applied. Fig. 2 is a sectional view of the assembled device. Fig. 3 is a similar detail view taken from the top in Fig. 2. Fig. 4 is an end view of the case of the apparatus with one head removed showing within the rotary member carrying a series of contacts hereinafter referred to. Fig. 5 is an interior view of the head of the case showing the spring contacts or fingers. Fig. 6 is a detail view of the rotary member showing the wiring intermediate the successive contacts.

Like parts are indicated by similar characters of reference throughout the different views.

The high power electric lamps commonly used on motor vehicles cast such a glare of light as to blind and confuse pedestrians and the drivers of approaching vehicles. It has been found very desirable to momentarily dim the head-lights of two approaching vehicles in order that they may safely pass one another. While head-lights of high power are to be desired for country driving, such lights are not only useless in the well lighted streets of the city but are a source of annoyance and danger to others. It has been found very convenient to be able to vary the brilliancy of vehicle head-lights in inverse ratio to the street lighting of the city. That is, as vehicles approach the outskirts of the city where the streets are lighted by gas lamps less light will be required from the head light than on the dark country roads and by-ways, but more light will be needed than in the streets lighted by electric arc lamps. For this reason and also because it has been found undesirable to increase or decrease the lamp current suddenly, both on account of its effect upon the eyes of the driver and of those persons who may be approaching the vehicle, and because of its effect upon the generator, means have been provided for gradually varying the brilliancy of the lamp by either increasing or diminishing its power without interrupting the continuous lighting effect when changing from one power to another.

Referring to the drawings, 1 is the automobile head-light supplied from a source of electrical energy which may be a generator as shown in the drawings or a storage battery as is commonly used. Located upon the foot board or dash 3 of the vehicle within easy reach of the driver that it may be operated by either hand or foot of the driver is a dimming device 4 forming the subject matter hereof which is connected into the lighting circuit.

The dimmer comprises a circular casing 5 having oppositely disposed heads 6 and 7. Journaled in suitable bearings in the heads 6 and 7 is a revoluble shaft 8 upon which are secured a plurality of disks 9 of non-conductive material preferably asbestos. In the drawings the disks 9 have been shown clamped tightly together and positively secured to the shaft 8 by means of clamp nuts and washers 10 located on the shaft 8 on opposite sides of the disks 9.

Carried by the rotary disks 9 are a plurality of studs 11 extending through the disks and having heads 12 upon the exterior face of the rotary member arranged in a concentric path and constituting a series of contacts. Located between the layers or disks of the rotary member are lengths 13 of German silver or other wire connecting successive studs 11 and adapted to form resistance units 13 in the electric circuit, as hereinafter described. The resistance units 13 are embedded within the rotary member and are thereby protected from atmospheric effect and against oxidation. The resistance sections 13 may be of any desired length. In Fig. 6 they have been shown of short length and arranged in a very simple manner.

Sufficient space for resistance sections of greater length may be provided by alternately locating the resistance sections between the first and second, and between the second and third disks of the rotary member. It is obvious that the latter member may be made of any number of disks thereby accommodating a large quantity of resistance material. The disks being of non-conductive heat resistant material the sections of resistance are insulated one from the other and protected from deterioration. It will be noted by reference to Fig. 6 that the several sections of resistance material form a continuous line in which the studs 11 are located at regular intervals.

Secured to the face of the rotary member 9 is a concentric plate 14 electrically connected with the first stud 11 of the series. In the drawing the plate has been shown with a lateral extension 15 which overlaps the head 12 of the first stud 11 of the series designated in Fig. 4 as contact $a$. It is obvious that in lieu of the extension 15 the plate 14 may be electrically connected by wire with the first stud 11 of the series.

Projecting from the inner side of the head 6 are two spring contact members 16 and 17 insulated from the head 6 and provided with binding posts 18 and 19 respectively. The spring contact 16 is so positioned as to engage successively the circular heads 12 of the studs 11, as the member 9 is rotated. The second spring finger 17 bears upon the concentric plate 14 and forms an electrical contact therewith. Opposite sides of the lighting circuit are connected with the binding posts 18 and 19. The construction is such that the current entering through the binding post 19 passes through the spring finger 17 to the plate 14 and then through the connection 15 to the first contact head 12 of the series. If the rotary member 9 had been adjusted to such position that the contact finger 16 engages the head 12 in the initial contact position $a$ the current will pass from the plate 14 to the initial head 12 thence through the spring finger 16 and its binding post 18 to the lamp without having traversed any of the sections of the resistance material within the rotary member 9. In other words by the engagement of the spring finger 16 with the initial contact $a$ the resistance material 13 is eliminated from the main lighting circuit. Under such conditions the lamp receiving its full quota of electrical energy will burn brightly. When it is desired to dim the light the member 9 is rotated to bring the spring finger 16 into electrical contact with the successive heads 12 of the studs 11 of the series. When the rotary member has been adjusted to bring the contact finger 16 into engagement with the contact $b$, a single section of resistance material will be included in the circuit and the light will be correspondingly dimmed to a slight degree. The current in such cases will pass from the plate 14 to the initial contact thence through the first section of resistance material to the second stud 11 of the series, thence through the contact $b$ and the spring finger 16 to the lamp. By a further movement of the member 9 to such position that the spring finger 16 will engage the contact $c$ four sections of the resistance material will be included in the circuit thereby dimming the lamp to a proportionate degree. By a further adjustment of the rotary member whereby the spring finger 16 will be drawn into engagement with the last contact of the series indicated at $d$ the entire length of resistance material will be included in the circuit thereby dimming the lamp to its lowest degree. Any further adjustment of the rotary member will move the last contact head 12 out of engagement with the spring finger 16 thereby breaking the circuit and extinguishing the lamp. It is to be noted that the contact face 21 of the spring finger 16 is of such an extent that it will engage the succeeding head 12 before breaking contact with the preceding head thereby insuring a constantly closed circuit preventing any momentary interruption of the lamp during the adjustment of the device. It will be further noted that by this construction the light is gradually increased or decreased in turning the lamp on or off thereby obviating any sudden changes in the lighting power or sudden variations in the generator load.

To insure a perfect contact between the fingers 16 and 17 and the head 12 and concentric plate 14 a tension spring 22 is provided which tends to press the rotary member 9 laterally against the tension of the spring contact fingers 16 and 17. The spring 22 has been shown in the drawings in the form of an arcuate leaf spring bearing upon one of the clamping nuts 9. It is obvious however that a helical spring may be used for the same purpose in a common and well known manner.

The casing 5 containing the rotary member 9 and contact fingers is preferably though not necessarily mounted upon the front or dash board of the vehicle. The head 7 is provided with a plurality of studs 23 which bear upon the head or dash of the vehicle and serve to space the casing 5 away therefrom to provide an air space 24 intermediate the casing and head or dash. This permits a free circulation of air around the device to dissipate the heat generated by the passage of the current through the sections of the resistance material.

Attachment screws 25 extend through a dial plate 26 upon the face of the dash or head board and thence through the dash and engage in the studs 23 to secure the device in position. The actuating shaft 8 extends through the dash and dial plate and carries at its outer end a handle or lever 27 by which the shaft may be rotated to bring the contact heads 12 successively into engagement with the spring finger 16. The handle or lever 27 is preferably so adjusted upon the shaft 8 that when the spring finger 16 is in contact with the initial head $a$ of the series the handle or lever 27 will be in its lowermost position. In this position a slight kick of the operator's foot will be sufficient to rotate the member 9 to dim the lamp when approaching another vehicle.

A stop not shown in the drawings may be provided in the dial plate to prevent the rotation of the device in the opposite direction. It is obvious that suitable markings may be provided upon the dial plate to indicate the degree of illumination resulting when the handle or lever 27 is adjusted to various positions.

From the above description it will be apparent that there is provided a device of the character described, possessing the particular features of advantage before enumerated as desirable, but which is obviously susceptible of modification in its form, proportion, detail construction or arrangement of parts, without departing from the principle involved or sacrificing any of its advantages.

Having thus described my invention, I claim,

1. A rheostat comprising a housing, a shaft mounted therein, a plurality of revoluble disks of insulating material arranged side by side upon said shaft, a plurality of studs extending transversely through said disks, pieces of electrically conductive material interposed between said disks and connecting the studs one with another in series, an electrical contact member maintaining electrical engagement with a given stud continuously throughout the rotation of the disks, and a second contact member engaging said studs successively as the disks are rotated.

2. A rheostat comprising a housing, a shaft mounted therein, a plurality of revoluble disks of insulating material arranged side by side upon said shaft, a plurality of studs extending transversely through said disks, pieces of electrically conductive material interposed between said disks and connecting the studs one with another in series, a head of electrically conductive material carried by said shaft and rotatable in unison with the disks, an electrical connection between said head and the terminal stud of the series, and two contact members one engaging the said head and the other engaging the studs successively upon the rotation of the disks.

3. A rheostat comprising a plurality of plates of insulating material arranged side by side, a length of electrically conductive material clamped between said plates, a series of electrical contact points upon the exterior face of one of the plates and electrically connected at intervals within the interposed length of electrically conductive material, means for maintaining permanent electrical engagement with said interposed length of conductive material, and an electrical line contact brought into engagement successively with the contacts of said series by the relative movement of said plates and said line contact.

4. A rheostat comprising a plurality of rotary disks of nonconductive material arranged side by side, low conductive material interposed between the disks, contact points upon the exterior of the disks communicating with the low conductive material within, a circuit contact positioned to engage the contact points and means to rotate the disks to introduce more or less of the low conductive material into the circuit.

5. A rheostat comprising a body of nonconductive material composed of a plurality of separable layers superposed one upon another, electrically conductive material interposed between the layers of said body, a series of contact points upon the exterior of the body electrically connected at intervals with the interposed conductive material, means for maintaining permanent electrical connection with the interposed conductive material, and a contact member engaged with the successive contact points by the relative movement of the contact member and body.

6. A circuit controlling device comprising a casing, a revoluble shaft extending within the casing, a rotatable body of nonconductive material carried by the shaft within the casing, a section of low conductive material electrically connected with one side of the circuit, embedded in the rotatable body, a series of contact points carried by the rotatable body communicating with the low conductive material within, a contact finger connected with the other side of the circuit and supported upon the casing, positioned to engage the contact points as the body is rotated.

In testimony whereof, I have hereunto set my hand this 31st day of March 1914.

LEE F. CHANEY.

Witnesses:
James E. Ward,
F. L. Walker.